US007277370B2

(12) United States Patent
Lee

(10) Patent No.: US 7,277,370 B2
(45) Date of Patent: Oct. 2, 2007

(54) METHOD, APPARATUS, AND COMPUTER READABLE MEDIUM INCLUDING COMPUTER READABLE CODE FOR ERASING INFORMATION RECORDED ON A REWRITABLE RECORDING MEDIUM AND MEDIUM RESULTING THEREFROM

(75) Inventor: Young-woo Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 549 days.

(21) Appl. No.: 10/821,876

(22) Filed: Apr. 12, 2004

(65) Prior Publication Data

US 2004/0264329 A1 Dec. 30, 2004

(30) Foreign Application Priority Data

Apr. 11, 2003 (KR) .................. 10-2003-0023061

(51) Int. Cl.
*G11B 7/0055* (2006.01)
(52) U.S. Cl. .................... 369/47.53; 369/116
(58) Field of Classification Search ............ 369/47.53, 369/116; *G11B 5/09, 7/00*
See application file for complete search history.

(56) References Cited

U.S. PATENT DOCUMENTS 5,289,450 A * 2/1994 Mizumoto et al. ....... 369/53.37
6,813,107 B1 * 11/2004 Lee ............................ 360/39
6,963,525 B2 11/2005 Honda

FOREIGN PATENT DOCUMENTS

| JP | 06-103005 | 4/1994 |
| JP | 08-317104 | 11/1996 |
| JP | 2000-194524 | 7/2000 |

* cited by examiner

*Primary Examiner*—Aristotelis M. Psitos
(74) *Attorney, Agent, or Firm*—Staas & Halsey LLP

(57) ABSTRACT

A method, apparatus, and medium for erasing information recorded on a rewritable recording medium. The method includes: searching for test result information on a recording power recorded on a recording management area disposed on the recording medium; if corresponding test result information is found, reading in the test result information; and by using a recording power determined according to the read test result, recording a unique pattern on at least part of a user data area of the recording medium where predetermined information is recorded. According to the method, the writing characteristic can be greatly improved.

22 Claims, 7 Drawing Sheets

0 1 0 1 0 1 0 1 0 1

F F 0 0 F F 0 0 F F 0 0

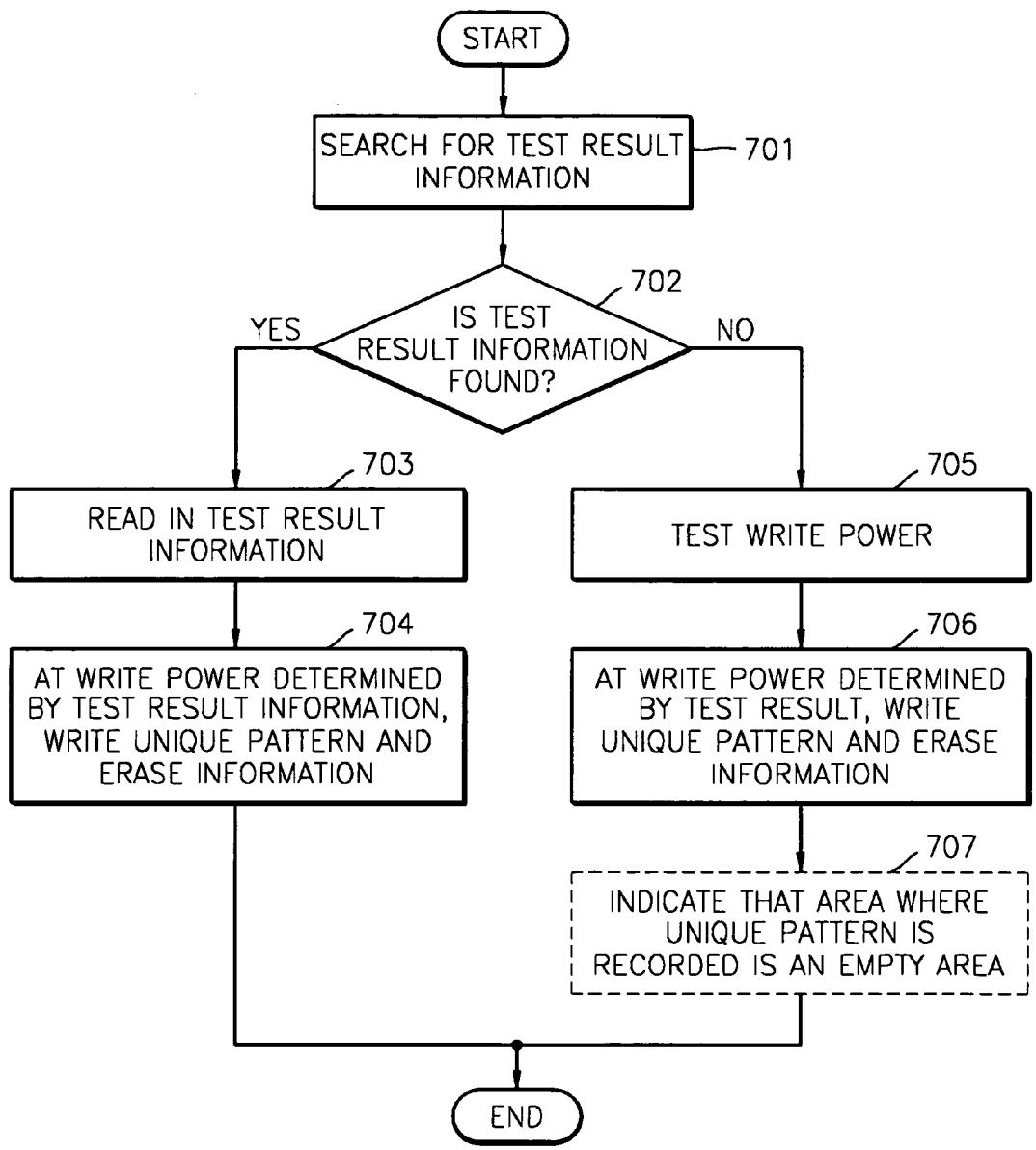

METHOD, APPARATUS, AND COMPUTER READABLE MEDIUM INCLUDING COMPUTER READABLE CODE FOR ERASING INFORMATION RECORDED ON A REWRITABLE RECORDING MEDIUM AND MEDIUM RESULTING THEREFROM

CROSS-REFERENCE TO RELATED APPLICATIONS

This application claims the benefit of Korean Patent Application No. 2003-23061, filed Apr. 11, 2003, the disclosure of which is incorporated herein by reference in its entirety.

BACKGROUND OF THE INVENTION

1. Field of the Invention

The present invention relates to a rewritable recording medium, and more particularly, to a method, apparatus, and computer readable medium for erasing information recorded on a recording medium, and a medium resulting therefrom.

2. Description of the Related Art

In the field for optical recording media, the rewritable digital versatile disc (DVD) market has recently been developing, after the release of read-only DVDs. The rewritable DVDs include a DVD-recordable (DVD-R), which is a write-once disc, and multiple-times rewritable discs such as a DVD-random access memory (RAM), a DVD-rewritable (DVD-RW), and another DVD-rewritable (DVD+RW), for example.

All of the DVD-RAM, DVD+RW, and DVD-RW have recording films formed with phase-change films. The phase-change film has a crystalline structure or amorphous structure based on an applied temperature. By controlling the power of a laser beam appropriately, to form the crystalline structure or amorphous structure of the recording film, information can be recorded. Generally, an area formed with an amorphous structure becomes a mark and an area formed with a crystalline structure becomes a space. The mark and space correspond with digital "1's" and "0's", respectively.

In the DVD-RAM, when predetermined information is already recorded in at least part of an interval of the disc and another information item is desired to be recorded, the other information item is recorded by writing over the already recorded information without first erasing the already recorded information. Also in the DVD-RW and a DVD+RW, a direct overwrite (DOW) system is employed and new information is recorded in one step for overwriting, without first erasing, already recorded information.

According to the overwrite method, an existing mark is erased and changed into a space, an existing space is changed into a mark, or both existing mark and space are changed into spaces or into marks. However, this overwrite method accelerates deterioration of a recording film and gradually degrades the recording characteristic of the film.

Meanwhile, the DVD-RW defines an erase mode and blank mode in which already recorded information can be erased by a DC erase power level, i.e., a maintained erase power level. The DC erase power level is typically lower than a recording power level, e.g., with there usually being three power levels, a recording power level, the erase power level, and a reading power level. For example, to record to the DVD-RW, the power level an incident light beam must be at least the recording power level. However, when information is recorded after erasing all information recorded on a user data area in the DC erase mode, if the frequency of erasure exceeds about 300 times, the recording characteristic becomes markedly degraded. In the blank mode, information recorded in a user data area of a disc is all erased to make the space empty. A recording medium should guarantee the recording quality of generally over 1000 times recording. However, even though information is erased in the erase mode/blank mode and then recorded in the DVD-RW, if the frequency of recording exceeds about 300 times, the recording characteristic of the DVD-RW is actually degraded such that it is difficult to guarantee usable life and recording quality of the DVD-RW.

SUMMARY OF THE INVENTION

The present invention provides a method, apparatus, and computer readable medium for erasing information on a recording medium so that the recording characteristic of a recording medium is improved when at least part of information recorded on the recording medium is erased and then new information is recorded on the location again, and a recording medium resulting from the operation of the method, apparatus, and computer readable code of the computer readable medium.

Additional aspects and/or advantages of the invention will be set forth in part in the description which follows and, in part, will be obvious from the description, or may be learned by practice of the invention.

To accomplish the above and/or other aspects and advantages, embodiments of the present invention provide a method for erasing information recorded on a recording medium, including searching for test result information on a recording power recorded on a recording management area disposed on the recording medium, reading the test result information if corresponding test result information is found, and recording a unique pattern, on at least a portion of a user data area of the recording medium where information is previously recorded, by using a recording power based on the read test result.

An indicator may be stored on the recording medium identifying that an area where the unique pattern is recorded is an area that is erased and ready for future recording. The indicator may be erasure information stored in a lead-in area of the recording medium. Further, the erasure information may include a location pointer, indicating the location of the recorded unique pattern.

To accomplish the above and/or other aspects and advantages, embodiments of the present invention provide a method for erasing information recorded on a recording medium, including searching for a test result information on a recording power recorded on a recording management area disposed on the recording medium, testing a recording power in a power control area, disposed on the recording medium, if the test result information is not found in the searching of the test result information, and recording a unique pattern, on at least part of a user data area of the recording medium, where information is previously recorded, by using a recording power result of the testing of the recording power.

The testing of the recording power may also be performed based on a power control area disposed in a lead-in area of the recording medium.

To accomplish the above and/or other aspects and advantages, embodiments of the present invention provide an apparatus for recording information on a recording medium, including a modulation unit modulating information into a data format to be recorded on the recording medium, a laser driver unit driving a laser diode to record the modulated information on the recorded recording medium, a photo-detector unit receiving a reflection of the laser beam, off the recording medium, and outputting information of the received laser beam, and a control unit providing output the information to the modulation unit and controlling an output laser power of the laser driver unit, based on the output recorded information provided by the photo-detector unit so that the modulated information is recorded on the recording medium, wherein while the control unit receives recorded output information, the control unit searches for power test result information recorded on a recording management area of the recording medium, tests the recording power of the laser beam in a power control area disposed on the recording medium if the test result information is not found, and controls the power of the laser driver unit by using the result of the test or search, such that a unique pattern is recorded in at least part of a user data area of the recording medium where information is previously recorded.

The control unit may control the power of the laser driver unit by using the test result information such that a unique pattern is recorded in at least part of the user data area if the test result information is found. In addition, the control unit may generate an indicator identifying that the area where the unique pattern is recorded is an erased area and available for future recording. The control unit may further control the recording, on the recording medium, of erasure information, which identifies where the unique pattern is recorded, in a lead-in area of the recording medium. The control unit may control the recording of a location pointer, on the recording medium identifying the location of the unique pattern, as the erasure information, in the lead-in area of the recording medium. Further, the control unit may also record flag information on the recording medium, identifying the area where the unique pattern is recorded as an erased area, in the front of the area where the unique pattern is recorded.

To accomplish the above and/or other aspects and advantages, embodiments of the present invention provide a recording medium, including a lead-in area storing a power control area for testing a recording power level of a laser beam from a recording and/or reproducing apparatus to read and/or write data to the recording medium, and a recording management area of previous test results of a recording power level, and a user data area set to being erased partially or completely when a unique pattern is recorded in the user data area, to enable the recording and/or reproducing apparatus to record new data to an erased area without that erased area having been erased with a DC erase level.

The lead-in area may include erasure information identifying that a portion of the user area where the unique pattern is recorded is an erased area. Flag information, identifying a portion of the user area as being an erased area, may be recorded in front of an area where the unique pattern is recorded, with an area with the unique pattern being the erased area.

To accomplish the above and/or other aspects and advantages, embodiments of the present invention provide a medium including computer readable code controlling a computer to implement an of the above methods, for erasing information recorded on the medium or another medium.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a flowchart of the operations performed by an erase method, according to another embodiment of the present invention.

DETAILED DESCRIPTION OF THE PREFERRED EMBODIMENTS

Figure 1:
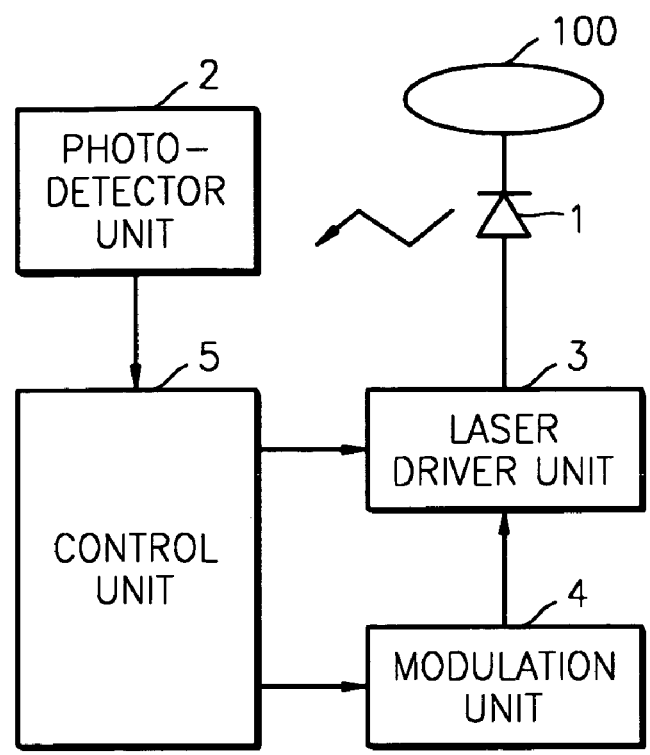
FIG. 1 is a block diagram of a recording and/or reproducing apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As illustrated in FIG. 1, for example, a recording and/or reproducing apparatus is an apparatus capable of recording information on a recording surface of a recording medium 100 by implementing a phase change operation on the surface of recording medium 100, and may include a laser diode 1, a photo-detector unit 2, a laser driver unit 3, a modulation unit 4, and a control unit 5.

The modulation unit 5 modulates predetermined information into a data format for recording on the recording medium 100. More specifically, the modulation unit 4 channel-modulates information and outputs the obtained data. In the present embodiment, 8/16 modulation and non return to zero inverse (NRZI) modulation can be employed, with the modulation unit 4 finally outputting NRZI data.

The photo-detector unit 2 receives a laser beam oscillated by the laser diode 1 and reflected by the recording medium 100, and outputs information of the received laser beam to the control unit 5. While providing to be recorded information to the modulation unit 4, the control unit 5 refers to information of the laser beam provided by the photo-detector unit 2 and outputs a control signal to the laser driver unit 3 so that the to be recorded information, which is modulated after being provided to the modulation unit 4, is recorded on the recording medium 100.

The laser driver unit 3 drives the laser diode 1 so that the NRZI data, output from the modulation unit 4 according to the control signal from the control unit 5, is recorded on the recording surface of the recording medium 100. According to the driving command of the laser driver unit 3, the laser diode 1 oscillates the laser beam to the recording surface of the recording medium 100. As a result, marks and spaces are formed on the recording surface of the recording medium 100 such that predetermined information is recorded.

In particular, by recording a unique pattern, according to embodiments of the present invention, the control unit 5 erases information recorded on the recording medium. Furthermore, the control unit 5 supports at least one of an erase mode and blank mode, according to embodiments of the present invention, as will be explained in detail hereinafter.

Figure 2:
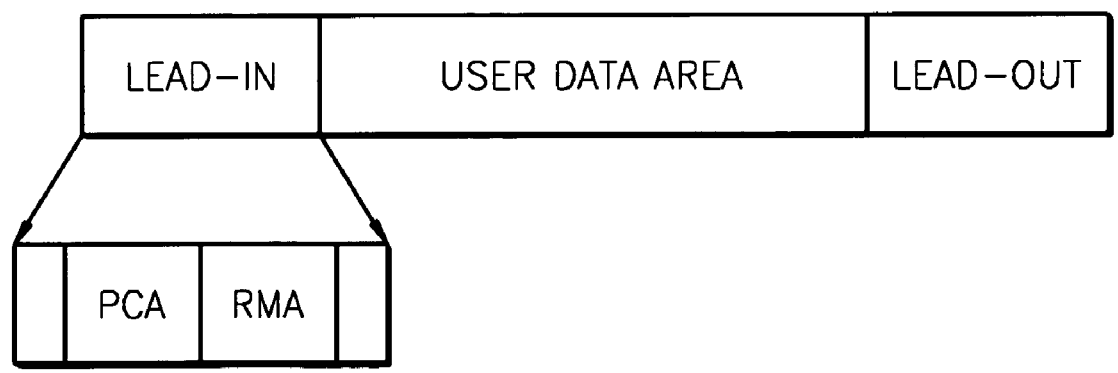
FIG. 2 is a diagram of a data structure of a recording medium.

FIG. 2 illustrates a data structure of the recording medium 100.

As illustrated in FIG. 2, the recording medium 100 includes a lead-in area, a user data area and a lead-out area. The lead-in area is located on an inner-circumference area and the lead-out area is located at an outer-circumference area. The user data area is located between the lead-in area and the lead-out area. The user data area is the area where user data is recorded. In particular, according to embodiments of the present invention, the lead-in area has a power control area (PCA) and a recording management area (RMA).

The PCA is an area designed for the recording apparatus to test the strength of a laser beam power applied to the recording medium. The RMA is an area for storing information on the result of such a test on the strength of power of the laser beam by the recording and/or reproducing apparatus.

Accordingly, if identical recording and/or reproducing apparatuses are used, the strength of power of the laser beam applied to the recording medium can be determined based on the test result recorded on the RMA, without the need for testing the power again. Therefore, the recording apparatus of FIG. 1 can search, and subsequently use, the RMA for recorded test result information, and if it is not found, test the laser beam power in the PCA. By using the power determined according to the test result, the recording apparatus can record a unique pattern on at least part of a user data area of the recording medium 100, in which predetermined information is recorded so that the information is erased. This will be explained in more detail below.

FIGS. 3A through 3D are schematic diagrams of a recording medium having intervals where information is erased by writing unique patterns to each recording medium, according to embodiments of the present invention.

Figure 3A:
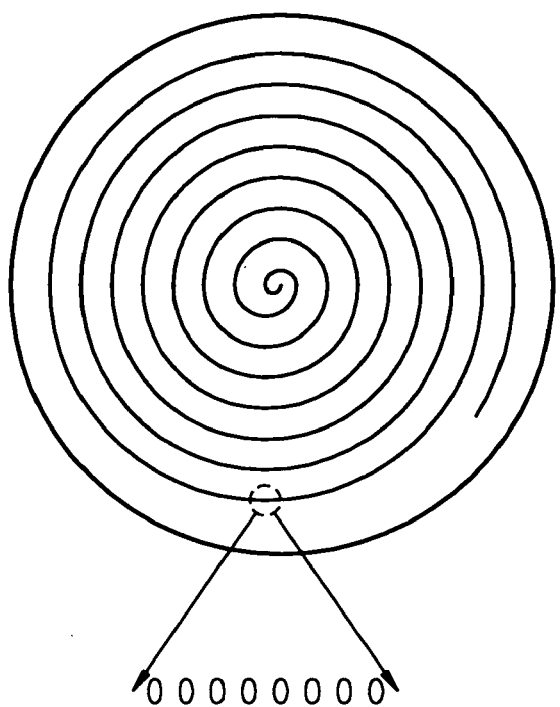
FIGS. 3A through 3D are schematic diagrams of a recording medium having intervals where information is erased by writing unique patterns, according to an embodiment of the present invention.

Referring to FIG. 3A, the unique pattern is formed with repeating "0's". The number of "0's" should be different from the number of "0's" that are continuously and repeatedly used to record predetermined information in the user data area, lead-in area and lead-out area.

Figure 3B:
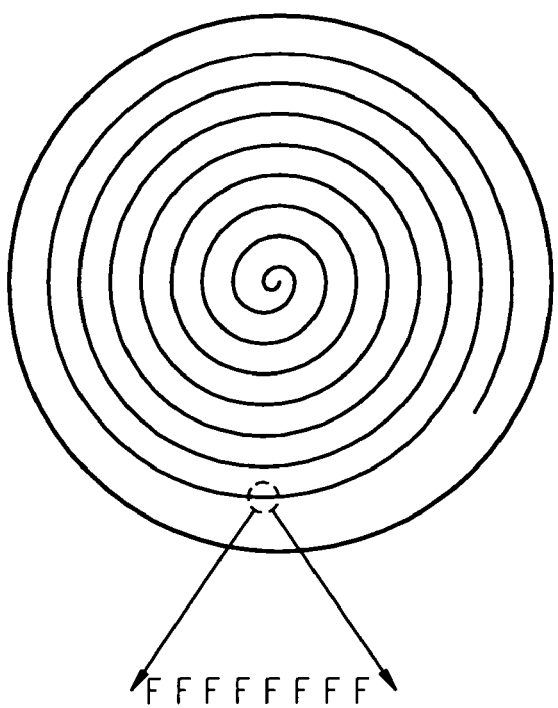

Referring to FIG. 3B, the unique pattern can be formed with repeating "F's".

"F" represents 15 in the hexadecimal number system. Also, the number of "F's" should be different from the number of "F's" that are continuously and repeatedly used to record predetermined information in the user data area, lead-in area and lead-out area.

Figure 3C:
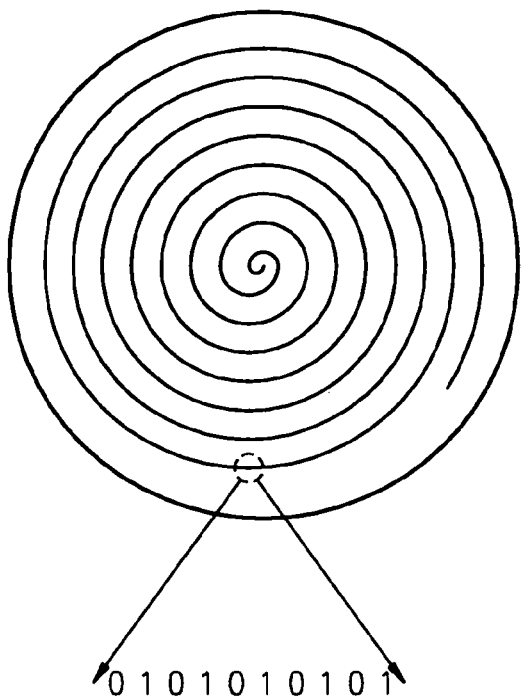

Referring to FIG. 3C, the unique pattern can be formed with repeating "01's". Also, the number of "01's" should be different from the number of "01's" that are continuously and repeatedly used to record predetermined information in the user data area, lead-in area and lead-out area.

Figure 3D:
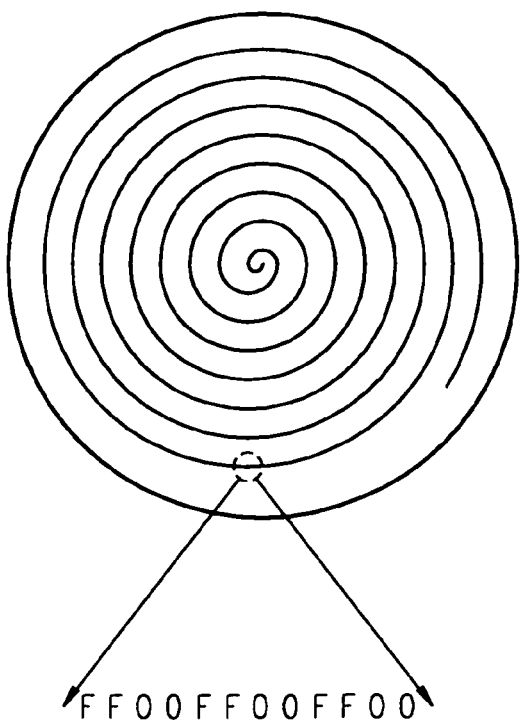

Referring to FIG. 3D, the unique pattern can be formed with repeating "FF00's". Also, the number of "FF00's" should be different from the number of "FF00's" that are continuously and repeatedly used to record predetermined information in the user data area, lead-in area and lead-out area.

Thus, the unique patterns are not the same as the patterns used to record predetermined information on the user data area, lead-in area and lead-out area. Accordingly, the area where the unique pattern is recorded is distinguished from other areas where predetermined information is recorded, e.g., in an area in the user data area, lead-in area and lead-out area already including recorded information, so the recording apparatus of FIG. 1 can recognize that a area where a unique pattern represents recorded is an area where information has been erased. Meanwhile, in addition to the above examples, the format of a unique pattern can be determined in a variety of ways as long as it is not a pattern used to record predetermined information in the user data area, lead-in area and lead-out area.

More specifically, the unique pattern is recorded in an erase mode and blank mode.

In the erase mode, the recording and/or reproducing apparatus of FIG. 1 erases part of an area where information is already recorded. At this time, the information is erased not by using a DC power level as conventionally done, but by recording a unique pattern according to the present invention. That is, in the erase mode, information is not physically erased to form a crystalline structured space, but by recording a unique pattern a logical erasure is actually performed. In addition to this method by which, whenever the erase mode is selected, information is erased by recording a unique pattern, the erase mode can be implemented in a variety ways. For example, a unique pattern can be recorded only in the erase mode, selected a first time, and then in every other selected erase mode operation implemented or a unique pattern can be used only in the erase mode selected after a predetermined number of selections of the erase mode, for example. At this time, when erasing is performed without recording a unique pattern, DC erasing may be performed in the conventional manner.

The Blank mode is a mode for emptying the entire user data area. In the blank mode, the recording and/or reproducing apparatus of FIG. 1 erases all information already recorded, such that the entire recording medium is emptied. According to embodiments of the present invention, the information is not erased by using the DC power level, as conventionally done, but by recording a unique pattern according to the present invention. That is, in the blank mode, information may not physically be erased to form a crystalline structured space, but by recording a unique pattern a logical erasure can be performed. In addition to this method by which, whenever the blank mode is selected, information is erased by recording a unique pattern, the erase mode can be implemented in other ways. For example, a method by which, in order to erase predetermined information, a unique pattern is recorded only in a blank mode selected a first time and then in every other selected erase mode operation implemented or a unique pattern can be used only in the erase mode selected after a predetermined number of selections of the erase mode. In this case, when erasing is performed without recording of the unique pattern, DC erasing may be performed in the conventional manner.

Figure 4A:
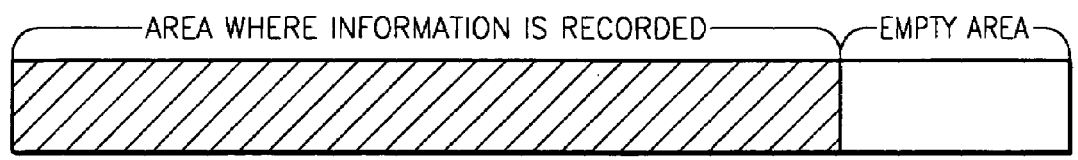
FIGS. 4A through 4C are schematic diagrams explaining a method of erasing information recorded on a recording medium in an erase mode, according to an embodiment of the present invention.
Figure 4B:
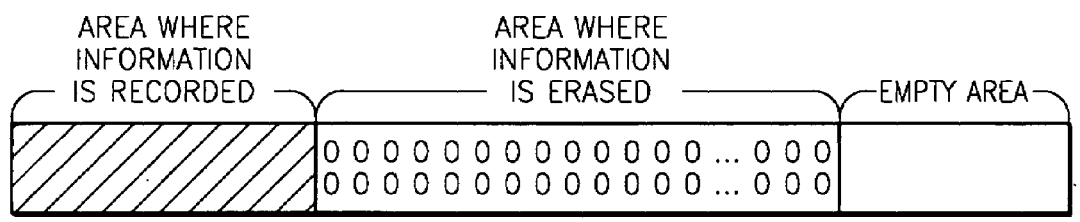
Figure 4C:
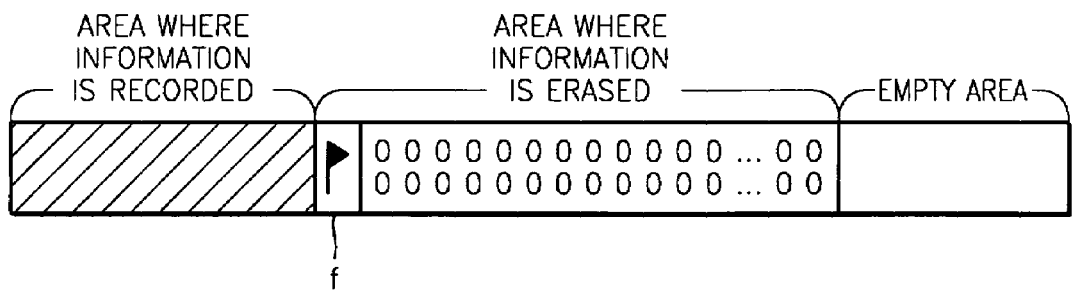

FIGS. 4A through 4C are schematic diagrams explaining methods of erasing information recorded on the recording medium 100, in the erase mode, according to another embodiment of the present invention.

FIG. 4A illustrates the user data area of the recording medium 100. The shaded part indicates an area where information is recorded and the remaining part is empty. FIG. 4B illustrates the result of the erase mode, where part of the shaded area of FIG. 4A, where information was recorded, is erased according to an embodiment of the present invention. In the erased part, "0's" form the unique pattern. FIG. 4C illustrates the same result as FIG. 4B except that flag information (f) is recorded in front of the erased part. Flag information (f) indicates that the following area of the recording medium is an area where a unique pattern is recorded, and thus an erased area. With the recorded flag information (f), the area where information is erased by recording the unique pattern can be detected more stably.

Figure 5A:
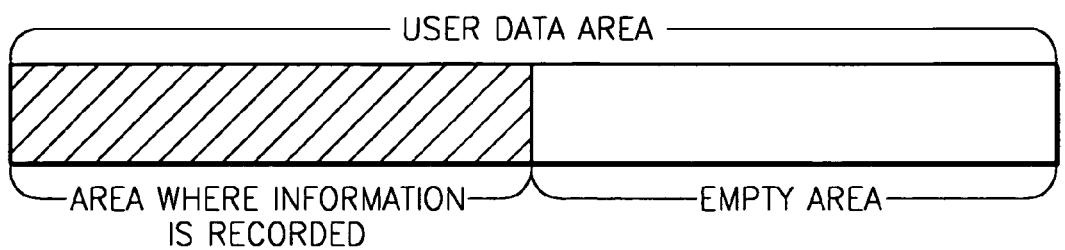
FIGS. 5A through 5C are schematic diagrams explaining a method of erasing information recorded on a recording medium in a blank mode, according to another embodiment of the present invention.
Figure 5B:
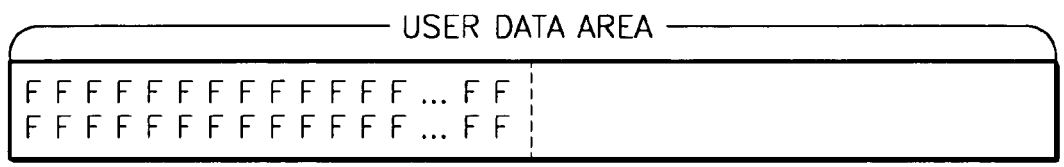
Figure 5C:

FIGS. 5A through 5C are schematic diagrams explaining the method of erasing information recorded on a recording medium, in the blank mode, according to another embodiment of the present invention. The shaded part indicates an area where information is recorded and the remaining part is empty. FIG. 5B illustrates a case where a unique pattern is recorded, according to an embodiment of the present invention, only on the area FIG. 5A where information is recorded, such that the information is erased and the entire user data area is emptied. In the erased part, "F's" form the unique pattern. FIG. 5C illustrates a case where, by repeatedly recording "F's" as the unique pattern on the user data area, the entire user data area is emptied. Thus, in the blank mode the recording medium 100 can be emptied by recording the unique pattern only on the area where information is recorded, or on the entire user data area.

Figure 6A:
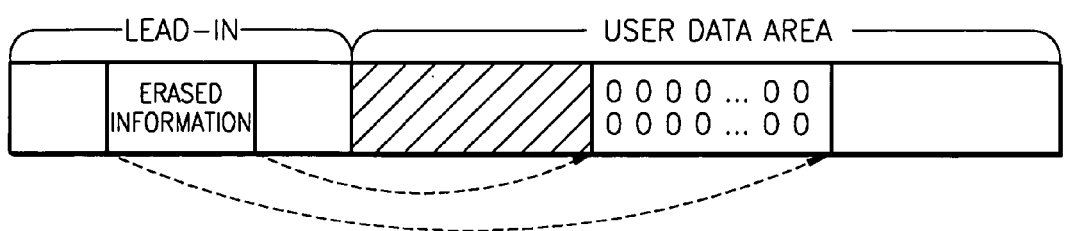
FIGS. 6A and 6B are schematic diagrams explaining a method of erasing information recorded on a recording medium, according to a still another embodiment of the present invention.
Figure 6B:
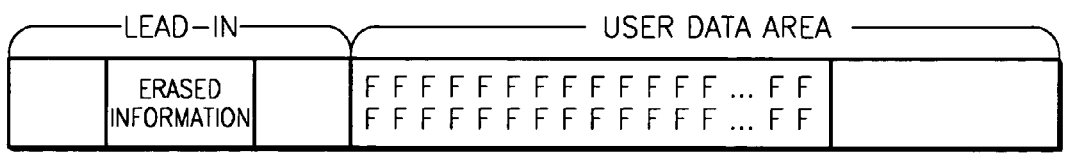

FIGS. 6A and 6B are schematic diagrams explaining the method of erasing information recorded on the recording medium, 100 according to a still another embodiment of the present invention.

As illustrated in FIG. 6A, the recording medium 100 has a lead-in area and a user data area. In the present embodiment, the shared part of the user data area is an area where predetermined information is recorded, as in FIG. 5, the area where "0's" are repeatedly recorded is an erased area, and the remaining part is an empty area. In addition, in the present embodiment, erasure information is recorded in the lead-in area. Erasure information includes information on whether or not there is an area where information has been erased by the recording of the unique pattern on the user data area, and a location pointer indicating the location of the area where the unique pattern is recorded. By reading erasure information from the lead-in area, the recording and/or reproducing apparatus of FIG. 1 can determine that there is an area where information has been erased by the recording of the unique pattern on the user data area.

FIG. 6B illustrates a case where predetermined information recorded in the user data area is erased by repeatedly recording "F's" to form the unique pattern, in the erase mode or blank mode. Accordingly, erasure information recorded in the lead-in area may include information indicating that predetermined information recorded in the user data area has been completely erased. Therefore, the recording reproducing apparatus of FIG. 1 can determine that information previously recorded on the user data is erased by the recording of the unique pattern, in the portion of the user data area where information was previously recorded.

Based on the structure described above, a method for erasing information recorded on a rewritable recording medium, according to embodiments of the present invention, will now be further explained.

FIG. 7 is a flowchart of the operations performed in an erase method, according to an embodiment of the present invention.

As illustrated in FIG. 7, the recording and/or reproducing apparatus searches for information on the result of a recording power test recorded in a recording management area (RMA) on the recording medium 100, in operation 701. If the corresponding test result information is retrieved, in operation 702, the test result information is read, in operation 703. By using the determined recording power, a unique pattern can be recorded on at least part of the user data area of the recording medium 100 where predetermined information is recorded, thereby erasing the same, in operation 704.

If the corresponding test result information is not found in the recording management area of the recording medium 100, in operation 702, the recording power can be tested in the power control area (PCA) of the recording medium 100, in operation 705. By using the recording power determined by the test result and recording a unique pattern on at least part of the user data area of the recording medium 100, where predetermined information is recorded, the information is erased, in operation 706. In addition, in operation 707, the area where a unique pattern is recorded is identified as an empty area. For example, erasure information indicating that a portion of the user data area has been erased, by the recording of the unique pattern, is recorded in the lead-in area, or flag information, indicating an erased area is recorded, in front of the erased area, i.e., the area where the unique pattern is recorded.

The embodiments described above can be implemented by computer readable code executed by a computer. Also, the computer readable code can be stored in a medium, and read and executed by a computer such that embodiments of the present invention can be performed. Such media may include, recording media, e.g., optical discs, wave guides, and carrier signals, for example.

Thus, a rewritable recording medium, when at least part of information recorded on the recording medium is erased and then new information is recorded over the same, according to embodiments of the present invention, recording characteristic can be greatly improved. That is, by introducing the described erase mode and blank mode erasing information, recorded as a unique pattern, recording characteristic and reproduction quality can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for erasing information recorded on a recording medium, comprising:

searching for test result information on a recording power recorded on a recording management area disposed on the recording medium;

reading the test result information if the test result information is found; and recording a unique pattern, on at least a portion of a user data area of the recording medium where information is previously recorded, by using a recording power based on the read test result.

2. The method of claim 1, further comprising:

storing an indicator on the recording medium identifying that an area where the unique pattern is recorded is an area that is erased and ready for future recording.

3. The method of claim 2, wherein the indicator is erasure information stored in a lead-in area of the recording medium.

4. The method of claim 3, wherein the erasure information comprises a location pointer, indicating the location of the recorded unique pattern.

5. A method for erasing information recorded on a recording medium, comprising:
   searching for a test result information on a recording power recorded on a recording management area disposed on the recording medium;
   testing a recording power in a power control area, disposed on the recording medium, if the test result information is not found in the searching of the test result information; and
   recording a unique pattern, on at least part of a user data area of the recording medium, where information is previously recorded, by using a recording power result of the testing of the recording power.

6. The method of claim 5, further comprising storing an indicator on the recording medium identifying that an area where the unique pattern is recorded is an erased area that is available for future recordings.

7. The method of claim 6, wherein the indicator is erasure information stored in a lead-in area of the recording medium.

8. The method of claim 7, wherein the erasure information comprises a location pointer indicating the location of the recorded unique pattern.

9. The method of claim 5, wherein the indicator is recording flag information, indicating an erased area of the user data area, stored in the user data area in front of the unique pattern.

10. The method of claim 5, wherein in the testing of the recording power, the testing is performed based on a power control area disposed in a lead-in area of the recording medium.

11. An apparatus for recording information on a recording medium, comprising:
   a modulation unit modulating information into a data format to be recorded on the recording medium;
   a laser driver unit driving a laser diode to record the modulated information on the recorded recording medium;
   a photo-detector unit receiving a reflection of the laser beam, off the recording medium, and outputting information of the received laser beam; and
   a control unit providing output the information to the modulation unit and controlling an output laser power of the laser driver unit, based on the output recorded information provided by the photo-detector unit so that the modulated information is recorded on the recording medium,
   wherein while the control unit receives recorded output information, the control unit searches for power test result information recorded on a recording management area of the recording medium, tests the recording power of the laser beam in a power control area disposed on the recording medium if the test result information is not found, and controls the power of the laser driver unit by using the result of the test or search, such that a unique pattern is recorded in at least part of a user data area of the recording medium where information is previously recorded.

12. The apparatus of claim 11, wherein the control unit controls the power of the laser driver unit by using the test result information such that a unique pattern is recorded in at least part of the user data area if the test result information is found.

13. The apparatus of claim 11, wherein the control unit generates an indicator identifying that the area where the unique pattern is recorded is an erased area and available for future recording.

14. The apparatus of claim 11, wherein the control unit records, on the recording medium, erasure information, which identifies where the unique pattern is recorded, in a lead-in area of the recording medium.

15. The apparatus of claim 14, wherein the control unit records a location pointer, on the recording medium identifying the location of the unique pattern, as the erasure information, in the lead-in area of the recording medium.

16. The apparatus of claim 11, wherein the control unit tests the recording power based on a power control area disposed in a lead-in area of the recording medium.

17. The apparatus of claim 11, wherein the control unit records flag information on the recording medium, identifying the area where the unique pattern is recorded as an erased area, in the front of the area where the unique pattern is recorded.

18. A recording medium, comprising:
   a lead-in area storing a power control area for testing a recording power level of a laser beam from a recording and/or reproducing apparatus to read and/or write data to the recording medium, and a recording management area of previous test results of a recording power level; and
   a user data area set to being erased partially or completely when a unique pattern is recorded in the user data area, to enable the recording and/or reproducing apparatus to record new data to an erased area without that erased area having been erased with a DC erase level.

19. The recording medium of claim 18, wherein the lead-in area includes erasure information identifying that a portion of the user area where the unique pattern is recorded is an erased area.

20. The recording medium of claim 18, wherein flag information, identifying a portion of the user area as being an erased area, is recorded in front of an area where the unique pattern is recorded, with an area with the unique pattern being the erased area.

21. A computer readable recording medium comprising computer readable code controlling a computer to implement the method of claim 1, for erasing information recorded on the medium or another medium.

22. A computer readable recording medium comprising computer readable code controlling a computer to implement the method of claim 5, for erasing information recorded on the medium or another medium.

* * * * *